US006269293B1

(12) United States Patent
Correa et al.

(10) Patent No.: US 6,269,293 B1
(45) Date of Patent: Jul. 31, 2001

(54) INTERACTIVE ENGINE AND AUTOMATIC TRANSMISSION CONTROL

(75) Inventors: Colt R. Correa, Lake Orion; Maurice B. Leising, Clawson; Shean P. Huff, Ann Arbor, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/210,977

(22) Filed: Dec. 14, 1998

(51) Int. Cl.$^7$ ................................................. B60K 41/22
(52) U.S. Cl. ................................ 701/51; 701/54; 701/64; 74/732.1; 477/109
(58) Field of Search ............................... 701/51, 54, 64; 74/732.1; 477/109, 123, 132

(56) References Cited

U.S. PATENT DOCUMENTS

| | | |
|---|---|---|
| 5,211,080 | 5/1993 | Leising et al. ........................ 477/143 |
| 5,450,828 | * 9/1995 | Sakamoto et al. .............. 123/339.11 |
| 5,468,198 | 11/1995 | Holbrook et al. .................... 475/123 |
| 5,596,495 | * 1/1997 | Brown et al. ......................... 701/51 |

* cited by examiner

*Primary Examiner*—William A. Cuchlinski, Jr.
*Assistant Examiner*—Arthur D. Donnelly
(74) *Attorney, Agent, or Firm*—Mark P. Calcaterra (57) ABSTRACT

An interactive engine and automatic transmission control system is provided wherein spark and air control are used to control engine speed to maintain a small positive torque on the transmission before and after coast down shifts. More particularly, a transmission controller is electrically coupled to an engine controller in a motor vehicle such that information can be passed therebetween. Such information includes a start of shift signal, a phase of the shift signal (i.e., clutch release phase, speed change phase, or clutch application phase), and a shift complete signal. In addition, the transmission controller identifies the type of shift that is occurring (i.e., fourth gear to third, third to second, or second to first), transmission oil temperature and the acceleration (braking) rate of the vehicle to the engine controller. During the three phases of a coast down shift, air flow control is used to supply an appropriate amount of air to the engine so that closed loop spark control can be used to adjust the speed of the engine. By maintaining the engine speed slightly above the turbine speed just before and just after a coast down shift, very little torque is transmitted through the transmission during the shift. As such, the coast down shift is practically imperceivable to the driver.

17 Claims, 6 Drawing Sheets

INTERACTIVE ENGINE AND AUTOMATIC TRANSMISSION CONTROL

BACKGROUND OF THE INVENTION

1. Technical Field

The present invention generally relates to transmission control systems and, more particularly, to an interactive engine and automatic transmission control system for improving vehicle drivability during coast down gear shifts and accelerations.

2. Discussion

When an automotive vehicle changes speeds from a cruising rate to a stop or near stop condition, the transmission shifts from a high forward gear down to a low forward gear. This event is known in the art as a coast down shift. In terms of shift quality and driver expectation, the points where the shifts occur are critical.

Shift points are chosen so that the torque on the transmission either remains entirely positive or entirely negative before, during, and after the shift. Because of the wide range of engine speeds that can exist during a coast down event, the shift points are confined to very narrow ranges. Shifting anywhere outside of these ranges has the potential to cause a torque reversal of the drive train which is detectable to the driver as a bump or knock.

Also, when braking moderately from a high speed, a driver expects the deceleration rate of the vehicle to remain constant. However, if a down shift occurs at a relatively high speed, it is possible for the turbine speed to increase substantially above the engine speed. The difference in speed between the engine and turbine will produce a negative torque which will tend to decelerate the vehicle. This torque will add to the driver's braking and cause an objectionable change in the deceleration rate of the vehicle.

For the above reasons, coast down shift points have been traditionally confined to low speed ranges. However, in terms of vehicle performance, low shift speeds can be undesirable. For example, when turning a corner a vehicle should optimally be in a down shifted gear just after entering the corner so that a better engine response and acceleration is provided out of the corner when the driver steps back into the throttle. If a vehicle is in a high gear when exiting the corner, time must be taken to perform a down shift and the desired vehicle response is delayed.

In addition, after braking to a near stop, a driver may tip back into the throttle to accelerate. This often happens when braking for a stop light and then accelerating when the light turns green before a complete stop is achieved. By placing the transmission in the appropriate gear prior to the driver pressing the accelerator pedal, vehicle performance is improved. Unfortunately, to date no effective control system has been provided for adequately down shifting the transmission.

In view of the foregoing, it would be desirable to provide a transmission controller which interacts with the engine controller to increase engine speed above turbine speed during a coast down shift with spark and air flow control so as to improve drivability.

SUMMARY OF THE INVENTION

The above and other objects are provided by an interactive engine and automatic transmission control system wherein spark and air control is used to control engine speed under high speed conditions to maintain a small positive torque on the transmission before and after coast down shifts. More particularly, a transmission controller is electrically coupled to an engine controller in a motor vehicle such that information can be passed therebetween. Such information includes a start of shift signal, a phase of the shift signal (i.e., clutch release phase, speed change phase, or clutch application phase), and a shift complete signal. In addition, the transmission controller identifies the type of shift that is occurring (i.e., fourth gear to third, third to second, or second to first), transmission oil temperature and the acceleration (braking) rate of the vehicle to the engine controller. During the three phases of a coast down shift, air flow control is used to supply an appropriate amount of air to the engine so that closed loop spark control can be used to adjust the speed of the engine. The amount of air supplied during a coast down shift is dependant on the acceleration rate of the vehicle and transmission oil temperature. Spark control is used in conjunction with the air flow control to change the speed of the engine to a level just above or at that of the turbine. By maintaining the engine speed slightly above the turbine speed just before and just after a coast down shift, very little torque is transmitted to the input of the transmission during the shift. As such, very little torque is transmitted through the transmission to the output shaft. Thus, the coast down shift is practically imperceivable to the driver.

As a further feature of the present invention, the capability of performing coast down shifts at higher speed enables shift points to be selected based on a particular vehicle driver's driving habits. For example, a person who is aggressive at braking and accelerating may have coast down shift points selected at a higher speed than a person who is less aggressive. As such, the aggressive driver is provided with good vehicle performance (acceleration and deceleration) while the less aggressive driver is provided with a smooth and quiet drive (e.g., less busy shift schedule).

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 8 is a flowchart illustrating the engine controller based down shift logic of the interactive control methodology of to the present invention.

DETAILED DESCRIPTION OF THE PREFERRED EMBODIMENTS

The present invention is directed towards a method of controlling coast down shifts in an automotive vehicle. More particularly, the present invention provides a method of increasing engine speed with spark control to a level at or slightly above that of the turbine speed just before and just after a coast down shift. By doing so, large levels of torque are prevented from being transmitted through the transmission during a coast down shift which improves drivability.

Figure 1:
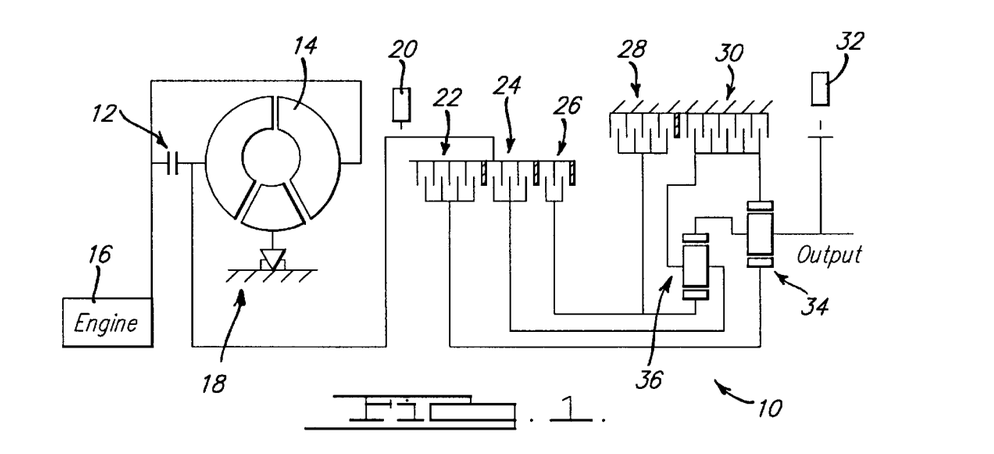
FIG. 1 is a schematic illustration of a transmission having its coast down shifts controlled by the interactive control methodology of the present invention.

Turning now to the drawing figures, FIG. 1 illustrates a transmission 10 suitable for use in conjunction with the present invention. A torque converter clutch 12 and torque converter 14 connect an engine 16 to the transmission 10. The torque converter 14 includes an impeller connected to the engine 16, an overruning clutch connected through ground to a stator, and a gear system connected to a turbine with the input to the torque converter clutch 12. An overrunning clutch 18 is coupled to the torque converter 14 to limit the transfer of torque to only one direction. A turbine speed sensor 20 is disposed downstream of the torque converter 14 and is operable for measuring the speed of the turbine.

The transmission 10 includes an under drive clutch 22, an overdrive clutch 24, and a reverse clutch 26. The transmission 10 also includes a "24" clutch 28 and a reverse clutch 30. An output speed sensor 32 is disposed downstream of the transmission 10 to measure a speed of the transmission output shaft. Depending upon the selective engagement of the above identified clutches, a rear planetary gear set 34 and a forward planetary gear set 36 effectuate different torque ratios through the transmission 10. As such, ratio or output to input speed is controlled.

For example, in park and neutral only the low reverse clutch 30 is engaged and the torque ratio through the transmission 10 is zero. In reverse, the reverse clutch 26 and low reverse clutch 30 are engaged and the torque ratio through the transmission 10 is −2.214. In fourth gear, the overdrive clutch 24 and "24" clutch 28 are engaged and a torque ratio of 0.689 is established through the transmission 10. In third gear, the under drive clutch 22 and overdrive clutch 24 are engaged and a torque ratio of 1.0 is established through the transmission 10. In second gear the under drive clutch 22 and "24" clutch 28 are engaged in a torque ratio of 1.573 is established through the transmission 10. In first gear, the under drive clutch 22 and low reverse clutch 30 are engaged and a torque ratio of 2.842 is established.

The transmission 10 is unique in the way that it interacts with the engine 16. That is, the application of all forward gearing clutches in the transmission 10 are directly computer controlled through the use of three-way high flow solenoids (not illustrated). By pulse width modulating the solenoids, direct element pressure control is achieved. Also, there are no overrunning clutches or bands (uni-directional devices) in the gearing of the transmission 10. Therefore, by applying pressure to a clutching element, either positive or negative torque can be transmitted to the output shaft.

When making a coast down shift, the active clutches in the transmission 10 experience many phases. Initially, the shift starts by lowering the pressure on the release clutch (which may be any of the clutches identified above) while pressure is increased on the apply clutch. This is called the "release phase" of the shift. Subsequently, the pressure on the release clutch drops to a low enough value so that it begins to slip. When the amount of slip is great enough, this is the start of the "speed change phase" of the shift.

During the speed change phase, the release clutch pressure is controlled to produce a desired acceleration rate of the turbine. For example, increasing the pressure on the clutch tends to pull the speed of the turbine toward the higher gear ratio speed and therefore slows the rate of change of turbine speed. The flow of hydraulic fluid into the apply clutch is also controlled during this phase so that the apply clutch begins to apply pressure when the speed of the turbine is at or above the lower gear ratio speed.

After the turbine reaches the lower gear ratio speed, the pressure on the apply clutch is increased at a slow rate until it has enough torque capacity to hold the transmission in gear. At the same time, the release clutch is controlled to be in a fully off state. This part of the shift is called the "apply phase". Once the transmission controller (see FIG. 3) detects that the transmission 10 is in gear and that the apply clutch has a high enough capacity to hold the gear ratio, the shift is ended and the pressure in the apply clutch is raised to its maximum capacity.

Figure 2:
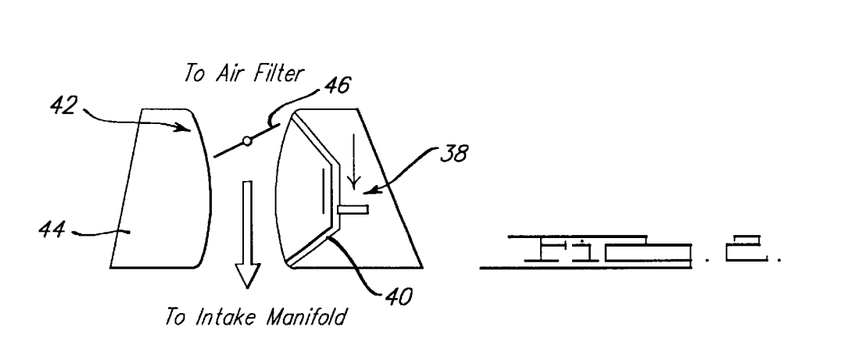
FIG. 2 is a schematic illustration of an idle air control device used in conjunction with transmission of FIG. 1.

Turning now to FIG. 2, the engine 16 includes an air control device 38 which enables the engine controller (see FIG. 3) to adjust the size of an air passage leading to the intake manifold of the engine 16. Such air control devices 38 are commonly used for engine idle control or as electronic throttle devices. The air control device 38 is disposed along an alternate air passage 40 which bypasses a main air passage 42 formed in the throttle body 44. The volume of air passing through the main air passage 42 is controlled by the vehicle operator depressing or releasing the accelerator pedal to move the throttle valve 46.

The air control device 38 has a fast response and is capable of linearly varying air flow. In this way, the amount of air mass delivered to the engine 16 is adjusted in real time which enables a target engine speed to be obtained. Restricting the air flow also reduces the pressure in the manifold. As a result of a smaller manifold pressure, the air density drops and less air mass enters into the engine cylinders. This causes a drop in the amount of combustible mass that produces energy. The net result is a drop in engine output torque and speed. By opening the alternate air passage 40, the opposite is accomplished and the speed and torque of the engine 16 are increased.

Although not illustrated, the engine 16 also includes conventional spark plugs and combustion chambers. As such, spark control also changes the speed and torque of the engine 16. Igniting the spark plug when the piston is in its top-most position (top dead center) is considered zero spark advance. Igniting the spark plug before the piston reaches top dead center is called advancing the spark. The torque output of the engine 16 increases as spark is advanced to a mean best torque point. If the spark is advanced further, the torque begins to drop off. By advancing and retarding the spark between top dead center and the main best torque point, the output torque of the engine 16 is changed.

As compared to air control, spark control has the advantage of quicker responsiveness. For example, the torque output of the engine 16 can be changed within the next cylinder spark event with spark control while idle air control requires the rate of air volume in the intake manifold to change. However, at low engine speeds, spark advance does not have the large range of authority. For example, a 20% change in spark advance might only have a 5% effect on the level of engine output torque. As will be described in greater detail below, the present invention uses both spark advance and air control to achieve a quick response and a large range of authority over engine and engine torque particularly at slow engine speeds.

Figure 3:
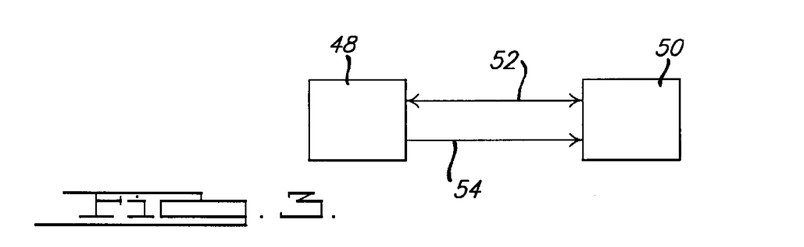
FIG. 3 is a schematic illustration depicting interactive communication between a transmission controller and an engine controller in accordance with the teachings of the present invention.

Turning now to FIG. 3, in order to coordinate spark control and air flow control with transmission coast down shifts, communication is established between the transmission controller 48 and the engine controller 50. To accomplish this, two electronic communication paths are established therebetween. That is, an on board vehicle data bus 52 and a torque reduction line 54 are coupled between the transmission controller 48 and the engine controller 50. The on board vehicle bus 52 enables the on board vehicle controllers 48 and 50 to communicate to one another and, preferably, allows at least 10 bytes of data to be sent in one message with a transmission time repeating rate of about 35 milliseconds or greater.

The torque reduction line 54 is preferably a dedicated single digital line that transmits either a high or low signal from the transmission controller 48 to the engine controller 50. Messages are defined on the torque reduction line 54 by how long the signal is held in a certain state. For example, if the signal on the torque reduction line 54 is held low for greater than a pre-selected time, the engine controller recognizes the message as an "end of shift" or other pre-selected message.

To properly perform a downshift, the engine controller 50 receives a start of shift signal, a phase of the shift signal, and a shift complete signal from the transmission controller 48. In addition, the engine controller 50 receives signals from the transmission controller 50 indicating the type of shift that is occurring (i.e., fourth gear to third, third to second, or second to first), transmission oil temperature, and an acceleration (braking) rate. It should be noted that alternate methods of communication are not available.

Figure 4:
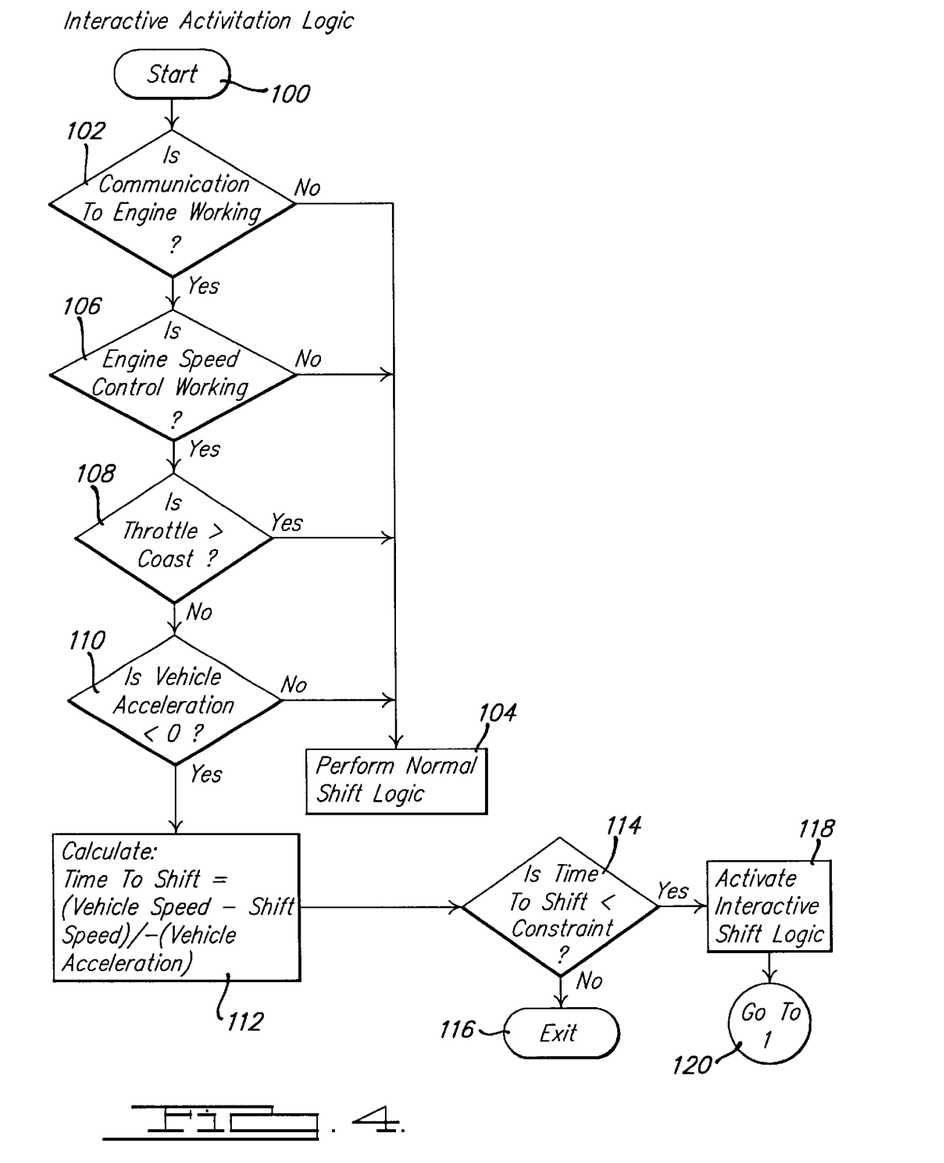
FIG. 4 is a flowchart illustrating the transmission controller based interactive control activation logic of the present invention.

Turning now to FIG. 4, a flowchart of the transmission controller based interactive control activation logic is illustrated. This logic determines when control of coast down shifts are to be handled by the interactive control methodology as opposed to conventional control. The methodology starts in bubble 100 and falls through to decision block 102. In decision block 102 the methodology determines if the communication paths between the transmission controller and engine controller are operating properly. If not, the methodology advances to block 104 and returns transmission control to the normal (i.e., non-integrated) shift logic. However, if the communication between the engine controller and transmission controller is operating properly at decision block 102, the methodology continues to decision block 106.

In decision block 106 the methodology determines if the engine speed control logic is operating properly. That is, the methodology determines if proper control over spark timing and air flow volume exists. If proper control does not exist, the methodology advances from decision block 106 to block 104 and returns shift control to conventional logic. However, if the integrity of the engine speed control logic is sound, the methodology advances from decision block 106 to decision block 108.

In decision block 108, the methodology determines if the position of the throttle is greater than that of a coasting position. If the throttle position is beyond a coast position, the engine is not operating in a coast down situation and therefore the interactive control logic of the present invention is not needed. As such, the methodology advances from decision block 108 to block 104 to return shift control to conventional shift logic. However, if the throttle is less than or equal to a coasting position at decision block 108, a coast down condition may exist. As such, the methodology advances from decision block 108 to decision block 110.

In decision block 110, the methodology determines if the vehicle acceleration rate is less than zero (i.e., if the vehicle is decelerated). If the vehicle acceleration rate is not less than zero, the vehicle is not in a coast down condition. Therefore, the interactive shift control logic of the present invention is not necessary. As such, if the vehicle acceleration is greater than or equal to zero at decision block 110, the methodology advances to block 104 and returns control to conventional logic. However, if the vehicle acceleration rate is less than zero at decision block 110, a coast down condition exists and the methodology advances to block 112.

In block 112, the methodology calculates a time until the next shift point. This time is determined by dividing the vehicle's speed less the transmission shift speed by the negative of the vehicle's acceleration rate:

Time to shift=(vehicle speed−shift speed)/−(vehicle acceleration)

It should be appreciated that the transmission shift speed is a function of the transmission's current gear. After calculating the time until the next shift at block 112, the methodology continues to decision block 114. In decision block 114, the methodology determines if the time until the next shift is less than a pre-selected threshold value. This threshold value corresponds to the time needed for the engine to respond to the control changes. If the time until the next shift event is greater than or equal to the threshold value, the methodology advances to bubble 116 and exits the subroutine pending a subsequent execution thereof.

However, if the time until the next shift event is less than the threshold value, the methodology advances to block 118. In block 118, the methodology activates the interactive shift logic in the transmission controller. From block 118, the methodology advances through connector 120 to the release phase logic portion of the interactive engine and transmission control methodology which is illustrated in FIG. 5.

Figure 5:
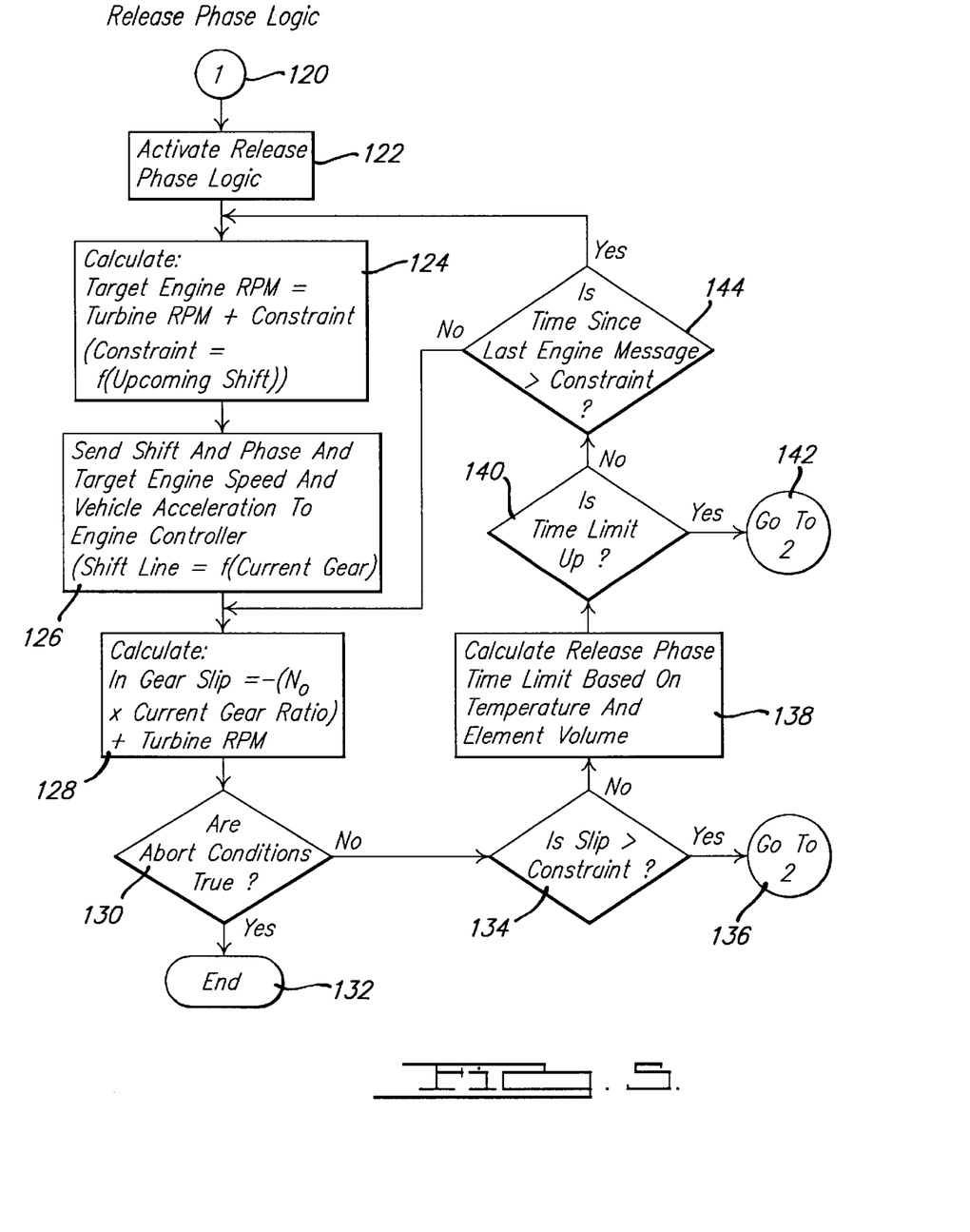
FIG. 5 is a flowchart depicting the clutch release phase logic of the interactive control methodology of the present invention.

Referring now to FIG. 5, the release phase logic begins by falling through connector 120 to block 122. In block 122, the methodology activates the release phase logic of the present invention. Accordingly, the methodology advances to block 124.

In block 124, the methodology calculates a target engine speed (RPM) value. The target engine RPM value is determined by adding a known tolerance value to the turbine speed (RPM):

Target engine RPM=turbine RPM+tolerance

It should be appreciated that the value of the tolerance is a function of the type of upcoming shift. After calculating the target engine RPM value at block 124, the methodology continues to block 126.

In block 126, the methodology sends a type of shift signal, phase of shift signal, target engine speed signal, and vehicle acceleration rate signal from the transmission controller to the engine controller. As will be described in greater detail below, the engine controller uses this information to select the proper amount of spark advance and air flow retardation to increase the speed of the engine to be equal to or slightly above that of the turbine speed to effectuate a smooth coast down shift. It should also be appreciated that the type of shift signal is a function of the transmissions current gear. Further, the signals delivered may be in any form such as, for example, a flag.

After sending the type of shift signal, shift phase signal, target engine speed signal, and vehicle acceleration signal to the engine controller at block 126, the methodology continues to block 128. In block 128, the methodology calculates the amount of in-gear slip. As described above, as the release clutch pressure is lowered, a slip is established within the active clutch of the transmission. When the amount of slip is great enough, the transmission is deemed to be in a speed change phase. When this occurs, additional coast down shift logic is employed.

The amount of in-gear slip is calculated by adding the turbine RPM to the negative of the transmission output speed multiplied by the current gear ratio speed:

In-gear slip=−(transmission output speed*current gear ratio)+turbine RPM.

After calculating the amount of in gear slip in block 128, the methodology continues to decision block 130.

In decision block 130, the methodology determines if certain abort conditions exist. For example, such abort conditions may include an amount of gear slip which is greater than a fail safe value. If the abort conditions exist at decision block 130, the methodology advances to bubble 132 and exists the subroutine pending a subsequent execution thereof. However, if the abort conditions do not exist at decision block 130, the methodology advances to decision block 134.

In decision block 134, the methodology determines if the amount of in-gear slip calculated at block 128 is greater than a known threshold value. The known threshold value corresponds to the amount of slip required to indicate that the speed change phase of the shift has started. If the amount of in-gear slip is greater than the known threshold value at decision block 134, the methodology advances to connector 136 for application of the speed change phase logic portion of the interactive control methodology. However, if the amount of in-gear slip is less than or equal to the threshold value, the methodology continues to block 138.

In block 138, the methodology calculates a release phase time limit which serves as a default for indicating the start of the speed change phase and therefore application of the speed change phase logic. The release phase time limit is a function of transmission oil temperature and clutch hydraulic fluid volume. After calculating the release phase time limit at block 138, the methodology continues to decision block 140.

In decision block 140, the methodology determines if the release phase time limit calculated at block 138 has expired. If the time limit has expired, the release phase of the shift is deemed complete and the methodology advances to connector 142 for implementation of the speed change phase logic. However, if the release phase time limit has not expired at decision block 140, the methodology continues to decision block 144.

In decision block 144, the methodology determines if the time since the last engine message was sent is greater than a known threshold value. The known threshold value corresponds to the maximum rate of communication (i.e., 35 milliseconds) which indicates that a new target engine RPM should be calculated. Thus, if the time since the last engine message was sent is greater than the threshold, the methodology advances from decision block 144 to block 124 and recalculates a new target engine RPM. However, if the time since the last engine message was sent is less than or equal to the threshold value, no new target engine RPM is needed. Therefore, the methodology advances from decision block 144 to block 128 to re-calculate the amount of in-gear slip.

Figure 6:
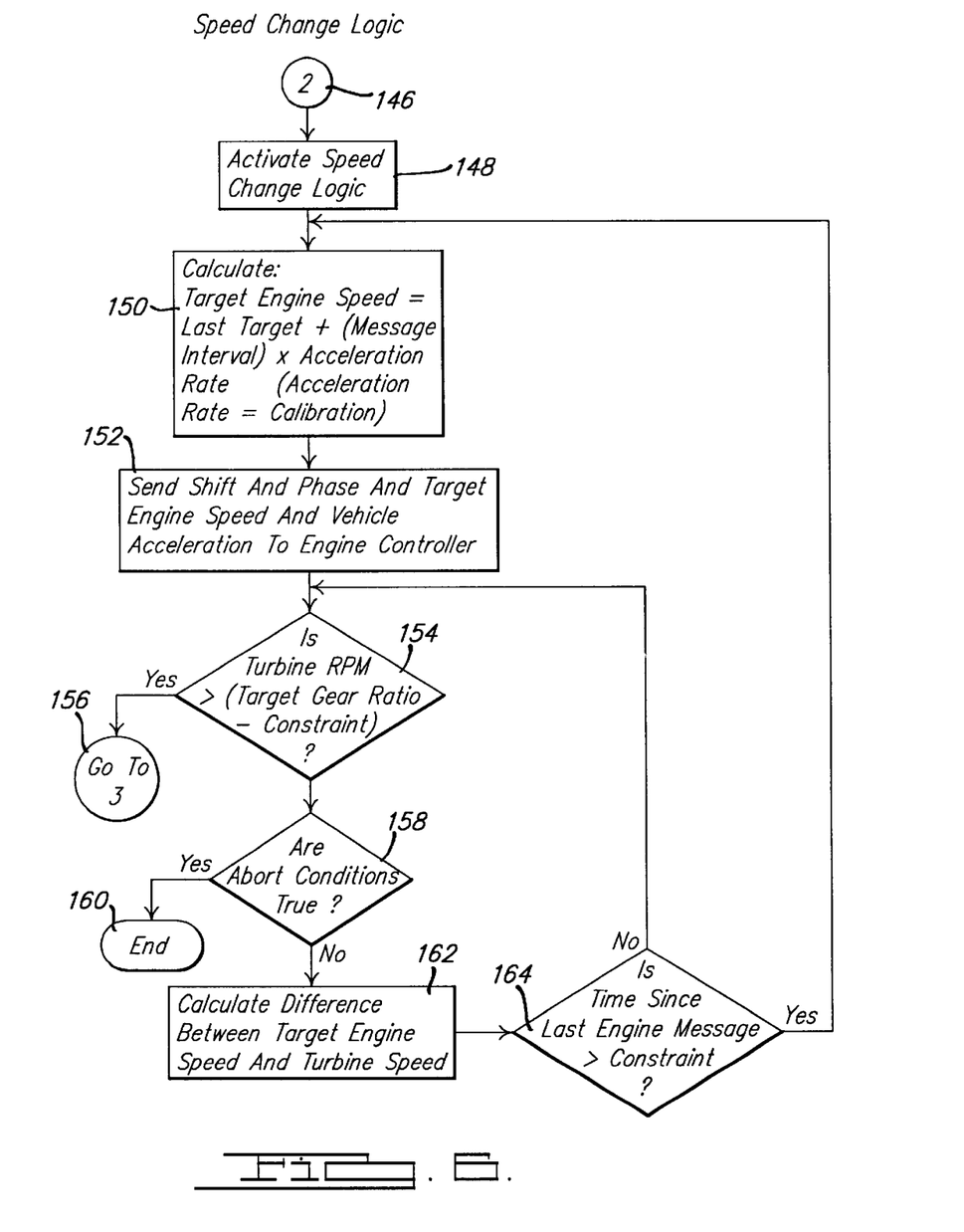
FIG. 6 is a flowchart illustrating the clutch speed change logic of the interactive control methodology of the present invention.

Referring now to FIG. 6, the speed change phase logic of the interactive engine and transmission control methodology of the present invention is illustrated. The speed change phase logic begins in connector 146 which follows from connectors 136 and 142 in FIG. 5. From the connector 146, the methodology falls through to block 148. In block 148, the methodology activates the speed change logic in the transmission controller. Accordingly, the methodology advances from block 148 to block 150.

In block 150, the methodology calculates a new target engine speed. The new target engine speed equals the last target engine RPM plus the time span between messages to the engine controller as multiplied by the acceleration rate of the vehicle:

New target engine speed=last target engine speed+(message interval*acceleration rate)

It should be appreciated that the acceleration rate is equivalent to a known calibration that is present in the current shift control. After calculating the new target engine speed at block 150, the methodology continues to block 152.

In block 152, the transmission controller sends a shift-type signal, a shift phase signal, a target engine speed signal, and a vehicle acceleration signal to the engine controller. As stated above, the engine controller uses these signals to select the proper spark advance and air flow retardation for increasing the engine speed to be at or slightly above the turbine speed so that the current coast down shift is smoothed. After sending the type of shift signal, phase of shift signal, target engine speed signal, and vehicle acceleration rate signal to the engine controller at block 152, the methodology continues to decision block 154.

In decision block 154, the methodology determines if the turbine speed is greater than the gear ratio speed for the target gear (i.e., the gear being shifted into) less a preselected tolerance value. As noted above, when the turbine speed approaches the gear ratio speed of the target gear, the speed change phase of the shift is ending and the apply phase of the shift is beginning. As such, if the turbine RPM is greater than the target gear ratio speed less the tolerance value, the methodology advances from decision block 154 to connector 156 for implementation of the apply phase logic. However, if the turbine RPM is less than or equal to the target gear ratio speed less the tolerance, the methodology continues from decision block 154 to decision block 158. It should be appreciated that the value of the tolerance is a function of the amount of slip that can be tolerated without causing a bump feeling when the apply clutch is engaged.

In decision block 158, the methodology determines if certain abort conditions exist such as the turbine RPM being less than the target gear ratio speed by more than a fail safe value. If the abort conditions exist in decision block 158, the methodology advances to bubble 160 and exist the subroutine pending a subsequent execution thereof. However, if the abort conditions do not exist at decision block 158, the methodology continues to block 162.

In block 162, the methodology calculates the difference between the target engine speed and the turbine engine speed. This difference is used subsequently to re-determine target engine speed. After calculating the difference between the target engine speed and turbine engine speed at block 162, the methodology advances to decision block 164.

In decision block 164, the methodology determines if the time since the last engine message was sent is greater than a known threshold value. The threshold value corresponds to a time indicating that a new target engine speed should be calculated. As such, if the time since the last engine message was calculated is greater than the threshold value, the methodology advances to block 150 for calculating a new target engine speed. However, if the time since the last engine message was sent is less than or equal to the threshold value, the methodology advances to decision block 154 for eventual advancement to connector 156 and implementation of the apply phase logic illustrated in FIG. 7.

Figure 7:
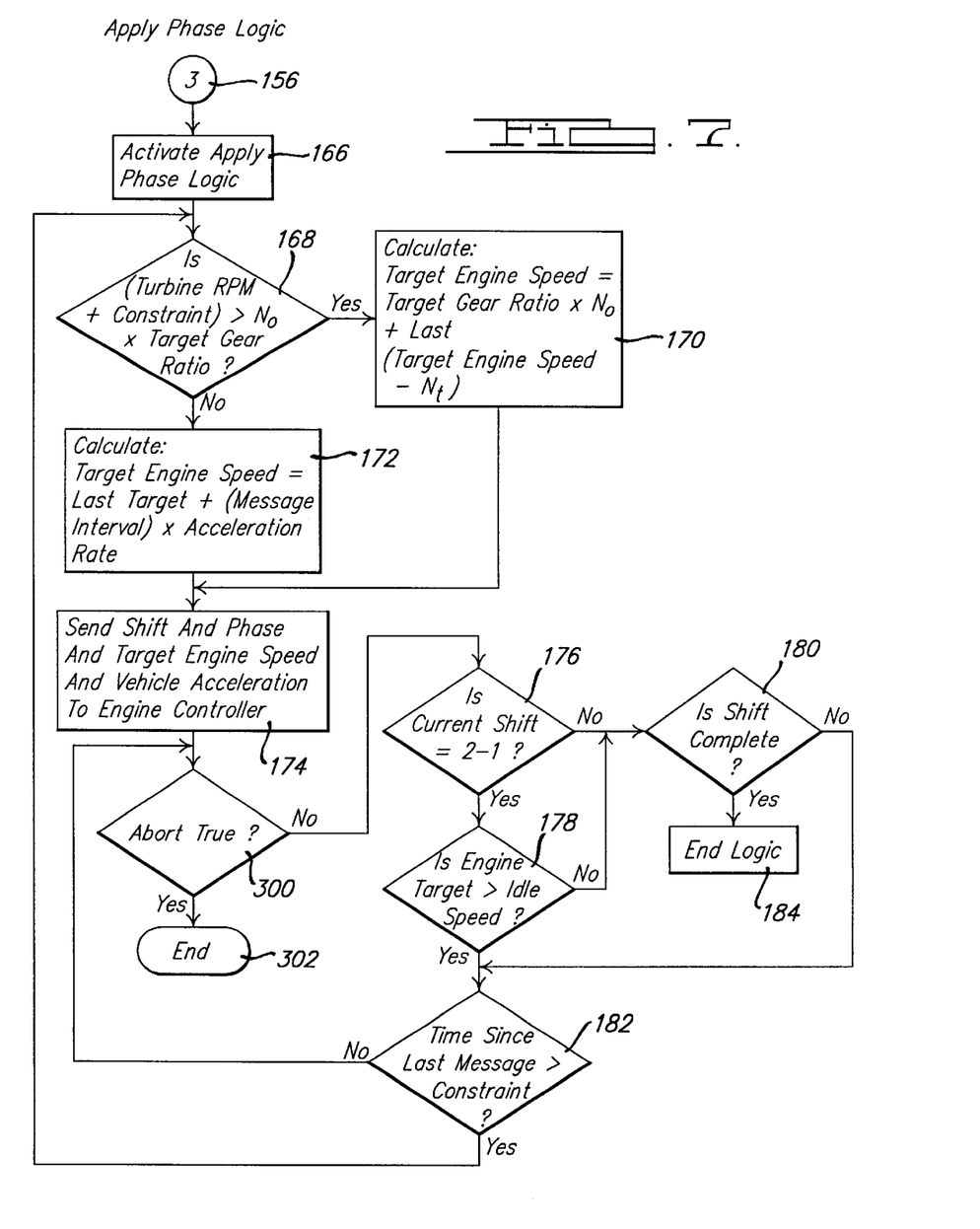
FIG. 7 is a flowchart illustrating the clutch application phase logic of the interactive control methodology of the present invention.

Turning now to FIG. 7, the apply phase logic portion of the interactive engine and transmission control methodology of the present invention is illustrated. The apply phase logic begins in connector 156 and falls through to block 166. In block 166, the methodology activates the apply phase logic in the transmission controller. As such, from block 166 the methodology continues to decision block 168.

In decision block 168, the methodology determines if the turbine speed plus a known threshold value is greater than the transmission output speed multiplied by the target gear ratio:

(Turbine RPM+threshold)>transmission output speed*target gear ratio?

According to the relationship of the turbine speed to the transmission output speed and target gear ratio, one of two methods of calculating a new target engine speed is employed. Thus, if the turbine RPM plus threshold value is greater than the transmission output speed times the target gear ratio value at decision block 168, the methodology advances to block 170. However, if the turbine RPM plus threshold value is less than or equal to the transmission output speed times target gear ratio value at decision block 168, the methodology advances to block 172.

In block 170, the methodology calculates a new target engine speed according to a first method. In this case, the target engine speed equals the target gear ratio multiplied by the transmission output speed, plus the last target engine speed minus the turbine speed:

Target engine speed=target gear ratio*transmission output speed+ last (target engine speed−turbine speed)

After calculating the target engine speed at block 170, the methodology continues to block 174.

In block 172, the methodology calculates the target engine speed according to a second method. In this case, the target engine speed equals the last target engine speed plus a time span between messages to the engine controller multiplied by the acceleration rate of the vehicle:

Target engine speed=last target engine speed+(message interval*acceleration rate)

After calculating the new target engine speed at block 172, the methodology continues to block 174.

In block 174, the transmission controller sends a type of shift signal, phase of shift signal, target engine speed signal, and vehicle acceleration rate signal to the engine controller. As stated above, the engine controller uses these signals to determine the appropriate spark advance and air flow retardation for increasing engine speed during the shift. After sending the type of shift signal, phase of shift signal, target engine speed signal, and vehicle acceleration rate signal to the engine controller block 174, the methodology advances to decision block 300.

In decision block 300, the methodology determines if certain abort conditions exist. For example, the methodology may determine if the calculated target engine speed is outside of a preselected range. If the abort condition exists at decision block 300, the methodology advances to bubble 302 and exits the subroutine pending a subsequent execution thereof. However, if the abort conditions do not exist at decision block 300, the methodology continues to decision block 176.

In decision block 176, the methodology determines if the current type of shift is from second gear to first gear. If the current shift involves a second gear to first gear transition, the engine target speed must be maintained above an idle engine speed. As such, if the current shift is from second gear to first gear, the methodology advances from decision block 176 to decision block 178. However, if the current shift is not from second gear to first gear, the methodology advances to decision block 180.

In decision block 178, the methodology determines if the engine target speed is greater than the engine idle speed. If the target engine speed is less than or equal to the engine idle speed, the methodology advances to decision block 180. However, if the engine target speed is greater than the engine idle speed, the methodology advances to block 182.

In decision block 180, the methodology determines if the shift is complete. As noted above, the shift is complete when the active clutch has a high enough capacity to hold the transmission in gear. Thus, if the shift is deemed complete at decision block 180, the methodology advances to block 184 where the pressure in the clutch is raised to its maximum capacity and the subroutine is exited pending a subsequent execution thereof. However, if the shift is not complete at decision block 180, the methodology advances to decision block 182.

In decision block 182, the methodology determines if a time since the last engine message was sent is greater than a known threshold value. The known threshold value corresponds to the maximum rate of communication which indicates that a new target engine RPM should be calculated. Thus, if the time since the last engine message was sent is greater than the threshold, the methodology advances from decision block 182 to block 168 to recompare the turbine speed to the transmission output speed and target gear ratio. However, if the time since the last engine message was sent is less than or equal to the threshold value, no new target engine RPM is needed. Therefore, the methodology continues from decision block 182 to decision block 300 to reverify the abort conditions.

Turning now to FIG. 8, the engine controller side of the interactive engine and transmission control methodology of the present invention is illustrated. The engine controller methodology starts in bubble 200 and falls through to decision block 202. In decision block 202, the methodology determines if a first coast down shift message for an upcoming shift has been received from the transmission controller. If no upcoming shift message has been received, the methodology advances to bubble 203 and exits the subroutine pending a subsequent execution thereof. However, if the first coast down shift message for an upcoming shift has been received by the engine controller from the transmission controller at decision block 202, the methodology advances to decision block 204.

In decision block 204, the methodology determines whether an end of shift message has been received from the transmission controller. If the end of shift message has been received, the methodology advances to block 206 to begin an end of shift phase logic portion of the methodology. However, if the end of shift message has not yet been received from the transmission controller at decision block 204, the methodology continues to decision block 208.

In decision block 208, the methodology determines if a fail safe timer has expired since the last message from the transmission controller was received. If the fail safe timer has expired, the methodology advances from decision block 208 to block 206 to begin the end of the shift phase logic of the methodology. However, if the fail safe timer has not yet expired since the last message was received from the transmission controller, the methodology advances from decision block 208 to decision block 210.

In decision block 210, the methodology determines if the vehicle throttle has opened. The throttle may open during a coast down shift, for example, when the vehicle operator applies pressure to the acceleration pedal during a coast down. If the throttle is open at decision block 210, the methodology advances to block 206 to begin the end of shift phase logic of the methodology. However, if the throttle is not open at decision block 210, the methodology continues to block 212.

In block 212, the vehicle acceleration rate signal and the target engine speed signal are received from the transmission controller and are saved. From block 212, the methodology continues to block 214 where the methodology receives the type of shift signal and phase of shift signal from the transmissions controller. From block 214, the methodology continues to block 216 and sets the flags for the spark proportional-integral-derivative gains and bypass air flow changes based on the type of shift signal identified from the transmission controller at block 214.

From block 216, the methodology continues to decision block 218. In decision block 218, the methodology determines if the phase of shift signal received at block 214 indicates that the transmission is in a release phase of the shift. If the phase of shift signal does not indicate that the transmission is in a release phase, the methodology advances to decision block 220. However, if the phase of shift signal indicates that the transmission is in a release phase, the methodology advances from decision block 218 to block 222.

In block 222, the methodology begins to implement engine control logic particularly for the release phase of the shift. As such, in block 222, the methodology freezes the base air flow at the value it had at the time of the start of the shift. After freezing the base air flow in block 222, the methodology continues to block 224 where the bypass air control mode is set to a coast down shift mode. From block 224, the methodology advances to block 226.

In block 226, the methodology sets the coast down air flow based on the type of shift signal received at block 214 (i.e., fourth gear to third, third to second, or second to first) and as a function of the transmission oil temperature and vehicle acceleration rate. As such, the total airflow is determined as follows:

Total airflow =base airflow+coast down airflow+load air-flow

After setting the coast down airflow in block 226, the methodology advances to block 228 and enables proportional-integral-derivative spark control based on the target engine speed received at block 212. During release phase spark control, the integral term is forced to zero. Thus, at block 228, the methodology also forces the integral term to zero and limits the spark negative ramp to a calibratible value.

After enabling spark control at block 228, the methodology continues to block 230 where the target engine speed is used to advance the spark such that the actual engine speed approaches the target engine speed. From block 230, the methodology advances to block 232 where the methodology disables the vehicles air compressor. After disabling the A/C unit in block 232, the methodology continues to bubble 234 where it exits the subroutine pending a subsequent execution thereof.

Referring again to decision block 220, the methodology again checks the phase of shift signal received at block 214. If the phase of shift signal indicates that the transmission is in a speed change phase, the methodology continues to block 236. However, if the phase of shift signal does not indicate that the transmission is in a speed change phase, the methodology advances to block 238.

In block 236, the methodology continues proportional-integral-derivative spark control based on the target engine speed received from the transmission controller at block 212. During the speed change phase, the integral term of the proportional-integral-derivative calculation is forced to zero. Thus, in block 236 the methodology also forces the integral term to zero.

After continuing spark control in block 236, the methodology advances to block 240. In block 240, the methodology modifies the coast down air flow by a calibratible amount. This calibratible amount corresponds to a level necessary to maintain an engine speed slightly above the turbine speed during the apply phase. After modifying the coast down air flow by a calibratible amount in block 240, the methodology advances to bubble 234 and exits the subroutine pending a subsequent execution thereof.

Referring again to block 238, since the phase of shift signal received at block 214 did not indicate that the transmission was in a release phase at decision block 218 and did not indicate that it was in a speed change phase at decision block 220, the phase of shift signal must indicate that the transmission is in an apply phase of the shift. As such, the methodology advances from block 238 to block 242. In block 242, the methodology continues proportional-integral-derivative spark control based on the target engine speed received at block 212. During the apply phase of the shift, the methodology allows the integral term calculation to be performed. After controlling the spark at block 242, the methodology continues to bubble 234 and exits the subroutine pending a subsequent execution thereof.

Referring again to block 206, the end of shift phase portion of the engine controller methodology will now be described. After beginning the end of shift phase logic in block 206, the methodology continues to block 244. In block 244, the methodology disables proportional-integral-derivative spark control and advances to decision block 246.

In decision block 246, the methodology determines if the spark advance setting is at the base calculated value. The base calculated value corresponds to desired emissions, efficiency, and smooth operation. If the spark setting is at the base calculated value at decision block 246, the methodology advances to block 248 where the methodology returns spark control to normal control logic. However, if the spark advance setting is not at the base calculated value at decision block 246, the methodology advances to block 250 where the methodology ramps out the spark setting by a calibratible amount. From blocks 248 and 250, the methodology continues to decision block 252.

In decision block 252, the methodology determines if the air compressor delay is complete. If the delay is complete, the methodology advances to block 254 and enables the air compressor unit of the vehicle. However, if the air compressor delay is not complete at decision block 252, the methodology bypasses block 254 and continues to bubble 234 where it exits the subroutine pending a subsequent execution thereof. Similarly, after enabling the air compressor at block 254, the methodology continues to bubble 234 and exits the subroutine.

Thus, the present invention provides interactive control of coast down shifts with the transmission controller and engine controller of a motor vehicle. According to the present invention, a target engine speed is calculated during a shift based on various engine parameters. As such, when a coast down shift occurs, the engine speed is controlled through spark control and air flow control to a level at or slightly above that of the turbine speed so that the shift occurs smoothly thereby improving drivability.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of performing a coast down shift in a transmission of a motor vehicle comprising:

detecting an upcoming coast down shift event;

determining a speed of a turbine in said transmission; and advancing a spark setting in an engine coupled to said transmission to increase a speed of said engine to a level at least as great as said speed of said turbine during said coast down shift event, said spark setting corresponding to a type of said coast down shift and a phase of said coast down shift, said phase of said coast down shift including a clutch release phase, a turbine speed change phase, and a clutch application phase, said spark setting corresponding to a target engine speed based on said speed of said turbine during said clutch release phase.

2. The method of claim 1 wherein said spark setting corresponds to a target engine speed based on a previous target engine speed and an acceleration rate of said turbine during said turbine speed change phase.

3. The method of claim 1 wherein said spark setting corresponds to a target engine speed based on a previous target engine speed, said speed of said turbine, a transmission output speed and a target gear ratio during said clutch application phase.

4. The method of claim 1 wherein said spark setting corresponds to a target engine speed based on a previous target engine speed and an acceleration rate of said vehicle during said clutch application phase.

5. The method of claim 1 wherein said step of increasing said speed of said engine further comprises changing an air flow to said engine.

6. The method of claim 5 wherein said air flow corresponds to a type of said coast down shift and is a function of transmission oil temperature and an acceleration rate of said vehicle.

7. A method of performing a coast down shift from a higher gear to a lower gear in a transmission of a motor vehicle comprising:

detecting an upcoming coast down shift event;

calculating a first target engine speed based on a speed of a turbine in said transmission;

changing a spark setting and airflow setting in an engine coupled to said transmission to increase a speed of said engine to said first target engine speed;

detecting a gear slip condition in said transmission;

calculating a second target engine speed based on said first target engine speed and an acceleration rate of said vehicle;

changing said spark setting and said airflow setting to change said speed of said engine to said second target engine speed;

detecting when said speed of said turbine is greater than a speed of said lower gear;

determining if said speed of said turbine is greater than an output speed of said transmission in said lower gear;

calculating a third target engine speed if said speed of said turbine is greater than said output speed of said transmission in said lower gear based on said output speed of said transmission in said lower gear and a difference between said second target engine speed and said speed of said turbine;

calculating a fourth target engine speed if said speed of said turbine is less than or equal to said output speed of said transmission in said lower gear based on said second target engine speed and said speed of said turbine;

changing said spark setting and said airflow setting to change said speed of said engine to said third target engine speed if said speed of said turbine is greater than said output speed of said transmission in said lower gear; and changing said spark setting and said airflow setting to change said speed of said engine to said fourth target engine speed if said speed of said turbine is less than or equal to said output speed of said transmission in said lower gear.

8. The method of claim 7 further comprising limiting said speed of said engine to a lower limit equal to an idle speed of said engine.

9. The method of claim 7 wherein said step of changing said spark setting and said airflow setting to change said speed of said engine to said first target engine speed further comprises setting said airflow setting as a function of transmission oil temperature and said acceleration rate, and setting said spark setting with proportional-integral-derivative control wherein said integral term is forced to zero.

10. The method of claim 7 wherein said step of changing said spark setting and said airflow setting to change said speed of said engine to said second target engine speed further comprises reducing said airflow setting by a calibratible amount, and setting said spark setting with proportional-integral-derivative control wherein said integral term is forced to zero.

11. The method of claim 7 wherein said step of changing said spark setting and said airflow setting to change said speed of said engine to said third target engine speed and said step of changing said spark setting and said airflow setting to change said speed of said engine to said fourth target engine speed further comprise setting said spark setting with proportional-integral-derivative control.

12. The method of claim 7 further comprising detecting an end of said coast down shift event and decreasing said speed of said engine to a normal state.

13. The method of claim 12 wherein said step of decreasing said speed of said engine to said normal state further comprises ramping out any changes to said spark setting.

14. The method of claim 12 wherein said end of said coast down shift event is deemed to occur if a throttle opening event is detected during said coast down shift.

15. The method of claim 7 wherein said first, second, third and fourth target engine speeds correspond to a type of said coast down shift.

16. The method of claim 7 wherein said slip condition is deemed to occur after a pre-selected time period.

17. The method of claim 7 further comprising disabling an air compressor system of said vehicle during said coast down shift.

* * * * *